United States Patent Office 3,437,148
Patented Apr. 8, 1969

3,437,148
METHOD AND ARTICLE FOR INCREASING THE PERMEABILITY OF EARTH FORMATIONS
Patrick J. Colpoys, Jr., Houston, Tex., assignor to Union Carbide Corporation, a corporation of New York
No Drawing. Filed Jan. 6, 1967, Ser. No. 607,630
Int. Cl. E21b 43/26
U.S. Cl. 166—308                                      6 Claims

ABSTRACT OF THE DISCLOSURE

A method for increasing the permeability of a subsurface earth formation wherein a fracture is created by a fracturing medium and such fracture is then propped open by a proppant having a sphericity and roundness of at least 0.8; a bulk density of not greater than 85 pounds per cubic foot and having an $L/D^2$ ratio of between 4000 p.s.i. and about 15,000 p.s.i. when the diameter of such proppant is between about 0.331 inch and about 0.200 inch.

---

This invention relates to a method for increasing the permeability of a subsurface earth formation penetrated by a well and more particularly to such a method wherein fractures extending from the well into the earth formation are propped with a spherical, rigid, low density propping agent.

It has become the usual practice in completing a well to create fractures extending from the well into the oil or gas bearing formation from which well fluids are to be produced. Fracturing is accomplished by pumping a fracturing liquid down the well and into contact with the underground formation to be fractured. The pressure on the fracturing liquid is increased to overcome the tensile strength of the formation and the weight of the overburden and thereby create the fracture, which is usually indicated by a sudden drop in the pressure on the fracturing fluid. A propping agent is suspended in a liquid which usually includes a jelling agent to increase viscosity of the fluid and thus its ability to carry proppants. This liquid may be the fracturing liquid or some other liquid and is fed down the well and into the fracture. The propping agent is deposited in the fracture and prevents closing of the fracture when the pressure on the fracturing liquid is released.

Sand, usually in the particle size of the order of 20 to 40 mesh (0.0331 to 0.0165 inch in diameter), was initially widely used as a propping agent. As the art of hydraulic fracturing of underground formations has progressed, it has become more and more common to use a propping agent comprised of larger particles to increase the fluid carrying capacity of the fracture. Frequently, particularly when the formation fractured is hard, the maximum fluid carrying capacity of the fracture will be obtained when a partial monolayer of propping agent is deposited in the fracture, and large sizes of propping agent are then highly advantageous in increasing fracture flow capacity.

Sand has several shortcomings as a propping agent but it is the most widely used commercial propping agent, because it is inexpensive, readily available and inert. Sand is a rigid propping agent but is not very crush resistant. When the compressive limit of the sand particle is exceeded, the material crushes. Such crushing continues until enough small particles are produced to either support the load or plug the fracture. If small particles support the load they cannot prop the faces of the fracture very far apart. Accordingly, the flow through capacity of fractures propped by sand is low.

Sand particles although usually referred to as being generally spherical are in fact quite angular in configuration. The sphericity of a proppant particle can be defined as the cube of the ratio of the volume of the particle to the volume of its circumscribing sphere. Thus, the sphericity values of particles can approach zero and unity and take any value between these limits. Likewise the roundness of a proppant particle can be defined as the ratio of the average radius of the corners and edges to the radius of the maximum inscribed circle of the maximum area of the particle. In practice the sphericity and roundness are determined by visually comparing the particle with a chart of standard images having known sphericity and roundness values. Using this procedure sand particles can be said to be truly angular rather than spherical or round. A table is included hereinbelow comparing sphericity and roundness of sand with the propping agents used in this invention.

Further sand particles have a high bulk density, usually about 115 lbs./cu. ft. This means that in order to suspend sand in a carrier fluid a jelling agent must be added to the fluid to increase its viscosity. Jelling materials in most cases have a built-in jell breaker which after a specific time period will dilute the jelling material thus facilitating removal from the well. In other cases the well has to be flushed with another fluid to remove the jelling agent from the well. Both of these procedures add to the expense of the operation.

Accordingly, it is the main object of this invention to provide a method for increasing the permeability of a propping agent and a subsurface earth formation using such propping agent which has the economics of sand but none of the disadvantages of sand.

Another object is to provide a method of propping fractures with a low cost spherical, rigid, low density propping agent.

Another object is to provide a method of carrying rigid, inert, propping agents into a fracture without the need for increasing the viscosity of the carrier fluid.

These and other objects will either be pointed out or become obvious from a study of the following disclosure.

The invention is predicated on the use of a low density, rigid, spherical propping agent having a crush strength at least that of sand in a method for propping fractures.

For purposes of this disclosure, the crush strength of a propping agent is determined by the ratio of $L/D^2$ where L is the maximum load in pounds supported by a particle and D is the diameter of the particle in inches.

Also while reference will be made to a preferred low density composition in describing the preferred embodiment of the invention, it should be understood that such reference is merely for illustration purposes and in no way is intended to limit the scope of the invention to the specific composition described.

It has been found that low density, rigid propping agents having a bulk density of not greater than 85 pounds per cubic foot, and having a sphericity and roundness of at least 0.8 and having a crush strength of at least between about 0.331 and 0.2000 inch in diameter may be injected the ratio of $L/D^2$ when the propping agent is between about 0.0331 and 0.200 inch in diameter may be injected into a carrier fluid and introduced into a well to increase the permeability of the earth formation surrounding the well bore.

The advantages of the method are several. The low density propping agents can be conveyed and injected in the method in a carrying fluid of lower viscosity thus reducing or indeed eliminating the need for auxiliary jelling agents and also jell breaking material. Also more low density propping agents are available in any given weight of material and thus are available as contact points for the overburden.

Additionally the propping agents of the invention when compared to sand are as cheap as sand but have a higher degree of sphericity and roundness while being at least as strong as sand in the smaller sizes and much stronger in the larger sizes. Sphericity and roundness, of course, are critical for permeability. Round particles do not pack and are more easily pumped and placed in the fracture.

Further the propping agents of the invention, while being rigid, low density and more spherical and round than sand, are as strong as sand in the smaller sizes and much stronger in the larger sizes.

In the preferred embodiment of the invention the low density propping agents are made from a composition which is predominately $SiO_2$, $Al_2O_3$ and $Fe_2O_3$. A specific range of ingredients which has been found to be ideally suited to the invention is as follows:

TABLE I

|  | Weight percent |
|---|---|
| $SiO_2$ | 35–50 |
| $Al_2O_3$ | 15–35 |
| Iron as $Fe_2O_3$ or $Fe_3O_4$ | 5–50 |
| CaO | .5–10 |
| Fixed C | .5–20 |
| Moisture | .1–1.0 |
| Exchangeable alkali | .5–5.0 |

More specifically in one example a composition of about 38.0 $SiO_2$; 19.0 $Al_2O_3$; 39.0 $Fe_2O_3$; 0.8 CaO; 0.7 MgO; 1.5 C and 1.0. Exchangeable Alkali all in weight percent was made into spheres of 4 x 6 mesh, 6 x 8 mesh, 8 x 12 mesh and 12 x 20 mesh so that the average diameter of the spheres was from about .0331 to about 0.1870 inch. The above ingredients are blended together and fed to a pelletizer. Moisture and in some cases a suitable binder are added to aid in pelletizing the ingredients. The moist pellets are then dried to drive off the moisture to a point to impart rigidity to the product to enable handling. The green product is then sintered at a temperature preferably in the range of from about 900 to 1200° C. The temperature and time at that temperature will depend on the density and strength desired within the ranges described. It was found that when the binder included sodium chloride the pellets produced had a vitreous-like glaze on the surface. This vitreous-like glaze obviates absorption of liquid by the pellets which in turn aids in keeping the bulk density of the pellets low.

The average strength of the spheres is given below.

TABLE II

| Size mesh: | Strength $L/D^2$, p.s.i. |
|---|---|
| 4 x 6 | 4725 |
| 6 x 8 | 7280 |
| 8 x 12 | 10,750 |
| 12 x 20 | 15,600 |

The sphericity and roundness of these pellets compared to various sands is given in Table III.

TABLE III

| Pellets (4 × 6 M) | 8 × 12 M Arkhola | 10 × 12 M Arkhola | 4 × 8 M Heart of Texas | 8 × 16 M Heart of Texas |
|---|---|---|---|---|
| 0.9R, 0.9S | 0.5R, 0.9S | 0.1R, 0.3S | 0.9R, 0.5S | 0.3R, 0.7S |
| 0.9R, 0.9S | 0.5R, 0.9S | 0.7R, 0.9S | 0.5R, 0.7S | 0.7R, 0.7S |
| 0.9R, 0.9S | 0.3R, 0.5S | 0.1R, 0.5S | 0.5R, 0.9S | 0.7R, 0.7S |
| 0.9R, 0.9S | 0.3R, 0.5S | 0.7R, 0.9S | 0.5R, 0.7S | 0.5R, 0.9S |
| 0.9R, 0.9S | 0.5R, 0.9S | 0.3R, 0.9S | 0.7R, 0.9S | 0.5R, 0.7S |
| 0.9R, 0.9S | 0.3R, 0.5S | 0.5R, 0.7S | 0.3R, 0.9S | 0.3R, 0.7S |
| 0.9R, 0.9S | 0.1R, 0.5S | 0.3R, 0.5S | 0.3R, 0.5S | 0.3R, 0.7S |

All the pellets of the invention had a sphericity and roundness of about 0.9. The bulk density of the various size pellets was between 50 and 65 lbs./ft.$^3$.

The pellets were then tested for permeability in a laboratory set-up as follows: A 50 ml. titration tube was filled with the 25 ml. mark with proppant. The remaining part of the tube was then filled with water. Table IV gives the average time that it took 20 ml. of water to flow through different proppants. The averages are based on three trials:

| Walnut Hulls: | Time (min.) |
|---|---|
| 8/12 M | 0.45 |
| 12/20 M | 0.55 |
| Sand: | |
| 8/12 M | 0.445 |
| 12/20 M | 0.70 |
| Proppants of this invention: | |
| 8/12 M | 0.276 |
| 12/20 M | 0.296 |

In practice a fluid such as crude oil, kerosene, acid or water which may or may not contain an agent to prevent fluid loss into the formation is pumped into the well under pressure to fracture the formation. Thereafter, a fluid containing the propping agent of the instant invention is forced into the fracture to deposit the propping agent therein. This fluid may be the unmodified fluid used in the first step or some other fluid. However, in any case, the necessity for adding jelling agents and therefore jell breaking material is obviated by the use of low-density propping agents.

It is to be understood that the specific example cited herein and the mode of operation specifically set forth are merely illustrative and that various modifications may be practiced without departing from the scope of the invention. For example, various combinations of ingredients may be used which might depart slightly from the ranges given above. Such departures are not deemed outside the scope of the invention if a spherical, rigid, low density, inexpensive propping agent is produced.

What is claimed is:

1. In a method for increasing the permeability of a subsurface earth formation penetrated by a well wherein a fluid is pumped into the well to create a fracture therein the improvement comprising injecting into a carrier fluid particulate rigid propping agents containing predominately $SiO_2$, $Al_2O_3$ and iron in the form of a compound taken from the group consisting of $Fe_2O_3$ and $Fe_3O_4$ and having a sphericity and roundness of at least 0.8; a bulk density of not greater than 85 pounds per cubic foot; and having an $L/D^2$ ratio of between about 4,000 p.s.i., and about 15,000 p.s.i. the diameter of said propping agents being between about 0.0331 inch and about 0.2000 inch, and introducing the propping agents carrying fluid into the fracture.

2. Method according to claim 1 wherein the $SiO_2$ is present in the range of from about 35 to about 50 weight percent; the $Al_2O_3$ is present in the range of from about 15 to about 35 weight percent; and the iron in the form of a compound taken from the group consisting of $Fe_2O_3$ and $Fe_3O_4$ is present in the range of from about 5 to about 50 weight percent.

3. Method according to claim 1 wherein the carrier fluid is the fracturing fluid.

4. A propping agent for propping a fracture in a subsurface earth formation having a composition comprising predominantely $SiO_2$, $Al_2O_3$ and iron in the form of a compound taken from the group consisting of $Fe_2O_3$ and $Fe_3O_4$ and characterized by being rigid, having a sphericity and roundness of at least 0.8, having a bulk density of less than 85 lbs./ft.$^3$ and a crush strength of between 4,000 and about 15,000 p.s.i., the diameter of said propping agent being between about 0.0331 and about 0.2000 inch.

5. A propping agent according to claim 4 wherein $SiO_2$ is present in the range of from about 35 to about 50 weight percent, $Al_2O_3$ is present in the range of from about 15 to about 35 weight percent, and iron in the form of a compound taken from the group consisting of $Fe_2O_3$ and $Fe_3O_4$ is present in the range of from about 5 to about 50 weight percent.

6. A method for increasing the permeability of a subsurface earth formation penetrated by a well comprising creating a fracture extending from the well into the formation, injecting into a carrier fluid particulate rigid propping agents containing predominately $SiO_2$, $Al_2O_3$ and iron in the form of a compound taken from the group consisting of $Fe_2O_3$ and $Fe_3O_4$ and having a sphericity and roundness of at least 0.8, a bulk density of not greater than 85 lbs./cu. ft. and $L/D^2$ ratio of from about 4,000 p.s.i. to about 15,000 p.s.i., the diameter of said propping agents being between about 0.0331 inch and about 0.2000 inch; and introducing the propping agents and carrier fluid into the fracture while depositing the propping agents in the fracture.

References Cited

UNITED STATES PATENTS

| | | | |
|---|---|---|---|
| 2,699,212 | 1/1955 | Dismukes | 166—42 |
| 2,950,247 | 8/1960 | McGuire et al. | 166—42 |
| 3,175,616 | 3/1965 | Huitt et al | 166—42 |
| 3,217,801 | 11/1965 | Fast et al. | 166—42 |
| 3,237,693 | 3/1966 | Huitt et al. | 166—42 |
| 3,266,573 | 8/1966 | Rixe | 166—42 |
| 3,285,340 | 11/1966 | Huitt et al. | 166—42 |
| 3,323,594 | 6/1967 | Huitt et al. | 166—42 |

OTHER REFERENCES

Degarmo, E. Paul: Materials and Processes in Manufacturing, N.Y., Macmillan Co., 1957, pp. 48 and 49.

Uren, Lester C.: Petroleum Production Engineering; Oil Field Exploitation, N.Y., McGraw-Hill, 1953, pp. 5–8.

JAMES A. LEPPINK, *Primary Examiner.*

IAN A. CALVERT, *Assistant Examiner.*

U.S. Cl. X.R.

252—8.55